US010128943B2

(12) United States Patent
Abidi

(10) Patent No.: US 10,128,943 B2
(45) Date of Patent: Nov. 13, 2018

(54) PREDICTIVE MAINTENANCE OF OPTICAL TRANSPORT NETWORK SYSTEM

(71) Applicant: AT&T Intellectual Property I, L.P., Atlanta, GA (US)

(72) Inventor: Mohammad Abidi, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/480,906

(22) Filed: Apr. 6, 2017

(65) Prior Publication Data

US 2018/0294876 A1 Oct. 11, 2018

(51) Int. Cl.
*H04B 10/00* (2013.01)
*H04B 10/079* (2013.01)
*H04B 10/27* (2013.01)

(52) U.S. Cl.
CPC ....... *H04B 10/07955* (2013.01); *H04B 10/27* (2013.01)

(58) Field of Classification Search
CPC .......................... H04B 10/07955; H04B 10/27
See application file for complete search history.

(56) References Cited

U.S. PATENT DOCUMENTS

| | | | | |
|---|---|---|---|---|
| 6,272,154 B1 * | 8/2001 | Bala | H04J 14/0206 | 359/341.3 |
| 6,317,231 B1 * | 11/2001 | Al-Salameh | H04B 10/077 | 398/14 |
| 6,407,834 B1 * | 6/2002 | Takeshita | H04J 14/0227 | 398/175 |
| 6,912,359 B2 * | 6/2005 | Blumenthal | H04B 10/00 | 398/149 |
| 7,301,612 B2 * | 11/2007 | Weaver | H04B 10/0775 | 356/73.1 |
| 8,139,937 B2 * | 3/2012 | Kim | H04Q 11/0067 | 398/100 |
| 8,254,788 B2 * | 8/2012 | Chen | H04B 10/0775 | 398/148 |
| 8,494,360 B2 * | 7/2013 | Chen | H04B 10/07951 | 356/364 |

(Continued)

FOREIGN PATENT DOCUMENTS

| | | |
|---|---|---|
| EP | 2741432 A1 | 6/2014 |
| EP | 2058960 B1 | 2/2017 |
| WO | WO 2006/096668 A2 | 9/2006 |

*Primary Examiner* — Agustin Bello
(74) *Attorney, Agent, or Firm* — Baker & Hostetler LLP

(57) ABSTRACT

A system for predictive maintenance of at least one optical network element in an optical transport network including a power monitor in communication with the at least one optical network element, the power monitor configured to selectively retrieve an actual power level from the optical network element; the power monitor being in communication with a data store having a specified power level for each of the at least one optical network element and an acceptable tolerance, wherein the specified power level includes a low mark and a high mark defining a specified power level range; wherein the power monitor compares the actual power level to the specified power level; and generates a signal if the actual power level is outside of the specified power level range by an amount greater than the acceptable tolerance.

19 Claims, 14 Drawing Sheets

(56) References Cited

U.S. PATENT DOCUMENTS

| | | | | |
|---|---|---|---|---|
| 8,588,606 | B2 * | 11/2013 | Watte | G01M 11/3118<br>398/10 |
| 9,414,448 | B2 * | 8/2016 | Salling | G01K 13/00 |
| 9,768,878 | B2 * | 9/2017 | Vassilieva | H04B 10/564 |
| 2002/0048066 | A1 * | 4/2002 | Antoniades | H04J 14/0209<br>398/82 |
| 2002/0191242 | A1 * | 12/2002 | Sommer | H04J 3/0602<br>398/1 |
| 2003/0138251 | A1 * | 7/2003 | Jayaram | H04B 10/077<br>398/38 |
| 2007/0116466 | A1 * | 5/2007 | Gewirtzman | H04J 3/1694<br>398/71 |
| 2008/0199185 | A1 * | 8/2008 | Miller | H04B 10/071<br>398/139 |
| 2012/0057450 | A1 * | 3/2012 | Abbas | H04L 5/1446<br>370/216 |
| 2016/0127038 | A1 * | 5/2016 | Liao | H01S 5/00<br>398/38 |
| 2016/0315712 | A1 * | 10/2016 | Vassilieva | H04B 10/564 |
| 2016/0344481 | A1 * | 11/2016 | Vassilieva | H04B 10/564 |
| 2017/0005723 | A1 * | 1/2017 | Prause | H04B 10/0793 |
| 2017/0207849 | A1 * | 7/2017 | Sinclair | H04B 10/0795 |

* cited by examiner

| Power Table for Transponders/CFPs expressed in dBm | | | | | | | | | | |
|---|---|---|---|---|---|---|---|---|---|---|
| | | | Client - Side | | | | Network - Side | | | |
| Part No. | CLEI Code | | OPR HWT | OPR LWT | OPT HWT | OPT LWT | OPR HWT | OPR LWT | OPT HWT | OPT LWT |
| 55555A-2 | ZF951AB | | N/A | N/A | N/A | N/A | 3 | -20 | 5.6 | 1 |
| E5-100GB | ZZ216AA | | 4.5 | -10.6 | 4.5 | -4.3 | N/A | N/A | N/A | N/A |
| H5-100GB | ZZ216AB | | 4.5 | -21.4 | 2.9 | -2.7 | N/A | N/A | N/A | N/A |
| | | | | | | | | | | |

PREDICTIVE MAINTENANCE OF OPTICAL TRANSPORT NETWORK SYSTEM

TECHNICAL FIELD

This disclosure relates generally to network management and, more specifically, to assigning and configuring general purpose hardware to support virtual network functions. Most specifically, the disclosure relates to retrieving optical power levels of network elements and comparing minimum, maximum and average power levels for each element to assess performance levels for maintenance.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual computer processing units (vCPUs), and network interfaces or network interface cards (NICs). Determining how to assign these resources among VMs in an efficient manner may be unbearably complex.

This disclosure is directed to solving one or more of the problems in the existing technology.

SUMMARY

A system for predictive maintenance of at least one optical network element in an optical transport network according to one example comprises a power monitor in communication with the at least one optical network element, the power monitor configured to selectively retrieve an actual power level from the optical network element; the power monitor being in communication with a data store having a specified power level for each of the at least one optical network element and an acceptable tolerance, wherein the specified power level includes a low mark and a high mark defining a specified power level range; wherein the power monitor compares the actual power level to the specified power level; and generates a signal if the actual power level is outside of the specified power level range by an amount greater than the acceptable tolerance.

According to another example, the disclosure provides a system for predictive maintenance of an optical transport network, the system comprising plural optical network elements in the optical transport network, each optical network element operating at an actual power level; at least one data store having a specified power level for each optical network element, wherein the specified power level includes a low mark and a high mark defining a specified power level range; a power monitor in communication with the data store and the optical network elements, the power monitor configured to selectively communicate with each optical network element according to a schedule, to retrieve the actual power level and store the actual power level in a memory, the power monitor is further configured to compare the actual power level to the specified power level, and wherein the power monitor is configured to generate a first signal upon detecting that the actual power level for at least one of the plural optical network elements is within an acceptable tolerance of the low mark or high mark, and wherein the power monitor is configured to generate a second signal upon detecting the actual power level for at least one of the plural optical network elements is outside of specified power level range.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Service providers continue to deploy optical transport network (OTN) with the goal of boosting bandwidth and increasing network functionality. OTN supports different traffic types in a more cost-effective manner than by using SONET/SDH networks. Carriers are placing particular emphasis on OTN in metro areas, where they are shifting rapidly from SONET/SDH to Dense Wavelength-Division Multiplexing (DWDM). With mounting data traffic on their networks, service providers today face a decision about how to use OTN. Carriers fall into three groups: 1) Some are looking at putting Internet Protocol (IP) traffic into OTN and then multiplex the OTN into DWDM; 2) Others want to use IP over DWDM, because most of their traffic is IP; 3) Some major carriers want to use OTN only for legacy time-division multiplexing (TDM) traffic, but will use packet interfaces for their IP traffic. As the transport networks are being transformed into optical transport network, it is extremely critical to routinely monitor optical network elements (ONE), such as, cards, ports or other elements that rely on optical emitters, such as, lasers to transport data across the network for any possible degradation of optical power levels. Such degradation and failure is one of the major issues relating to the health of OTNs. Degradation of laser and optical power levels can introduce digital performance monitoring (PM) errors causing loss of packets over the network requiring retries, which in the end lead to Layer1/Layer2/Layer3 service not meeting previously agreed to service level agreements (SLAs). According to the examples described herein, a system for predictive maintenance of optical network elements is provided, which on a routine basis retrieves an optical power level, or simply power level, of the optical network elements in the network and compares the maximum, minimum and average power levels at element. Then the system compares those actual retrieved values against the high and low water marks provided by the vendor of the network element. If the actual retrieved values are either not within the high and low water marks or are inside a tolerance required for error free transmission (acceptable tolerance), a work trouble ticket is 610609923.1 generated to repair or replace the affected network element. This allows repair or replacement of ONEs before they start either causing high digital PM errors or a hard failure helping service providers to meet previously agreed to SLAs with all customers. The system described in the examples below may be implemented in any network that contains optical network elements including but not limited to the several example networks described herein. An optical network according to the examples herein, is any network that includes at least on optical network element.

Figure 1A:
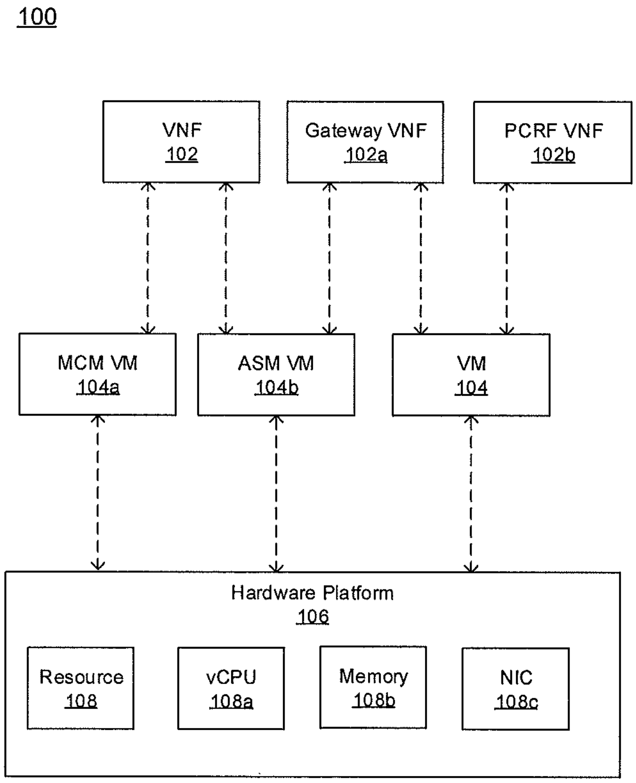
FIG. 1*a* is a representation of an exemplary network.

FIG. 1*a* is a representation of an exemplary network 100. Network 100 may comprise an SDN—that is, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions.

A virtual network function(s) (VNF) 102 may be able to support a limited number of sessions. Each VNF 102 may have a VNF type that indicates its functionality or role. For example, FIG. 1*a* illustrates a gateway VNF 102*a* and a policy and charging rules function (PCRF) VNF 102*b*. Additionally or alternatively, VNFs 102 may include other types of VNFs. Each VNF 102 may use one or more virtual machine (VM) 104 to operate. Each VM 104 may have a VM type that indicates its functionality or role. For example, FIG. 1*a* illustrates a management control module (MCM) VM 104*a* and an advanced services module (ASM) VM 104*b*. Additionally or alternatively, VM 104 may include other types of VMs. Each VM 104 may consume various network resources from a hardware platform 106, such as a resource 108, a virtual central processing unit (vCPU) 108*a*, memory 108*b*, or a network interface card (NIC) 108*c*. Additionally or alternatively, hardware platform 106 may include other types of resources 108.

Figure 1B:
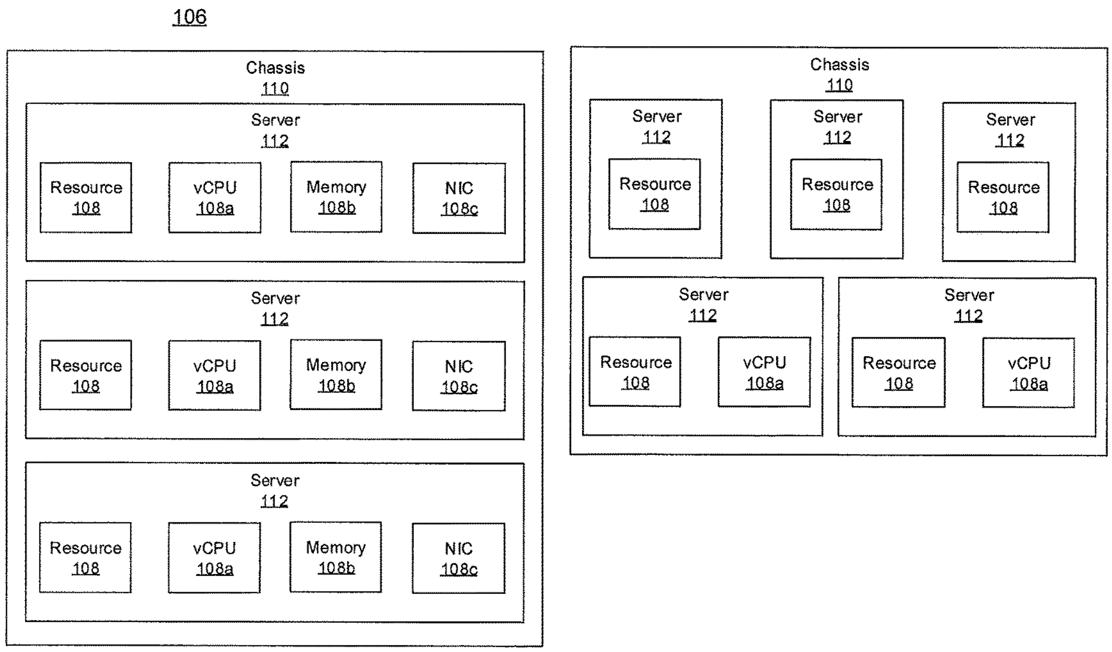
FIG. 1*b* is a representation of an exemplary hardware platform.

While FIG. 1*a* illustrates resources 108 as collectively contained in hardware platform 106, the configuration of hardware platform 106 may isolate, for example, certain memory 108*c* from other memory 108*c*. FIG. 1*b* provides an exemplary implementation of hardware platform 106.

Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together (not shown) in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together (not shown) in any combination or arrangement.

The characteristics of each chassis 110 and each server 112 may differ. For example, FIG. 1*b* illustrates that the number of servers 112 within two chasses 110 may vary. Additionally or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Given hardware platform 106, the number of sessions that may be instantiated may vary depending upon how efficiently resources 108 are assigned to different VMs 104. For example, assignment of VMs 104 to particular resources 108 may be constrained by one or more rules. For example, a first rule may require that resources 108 assigned to a particular VM 104 be on the same server 112 or set of servers 112. For example, if VM 104 uses eight vCPUs 108*a*, 1 GB of memory 108*b*, and 2 NICs 108*c*, the rules may require that all of these resources 108 be sourced from the same server 112. Additionally or alternatively, VM 104 may require splitting resources 108 among multiple servers 112, but such splitting may need to conform with certain restrictions. For example, resources 108 for VM 104 may be able to be split between two servers 112. Default rules may apply. For example, a default rule may require that all resources 108 for a given VM 104 must come from the same server 112.

An affinity rule may restrict assignment of resources 108 for a particular VM 104 (or a particular type of VM 104). For example, an affinity rule may require that certain VMs 104 be instantiated on (that is, consume resources from) the same server 112 or chassis 110. For example, if VNF 102 uses six MCM VMs 104*a*, an affinity rule may dictate that those six MCM VMs 104*a* be instantiated on the same server 112 (or chassis 110). As another example, if VNF 102 uses MCM VMs 104*a*, ASM VMs 104*b*, and a third type of VMs 104, an affinity rule may dictate that at least the MCM VMs 104*a* and the ASM VMs 104*b* be instantiated on the same server 112 (or chassis 110). Affinity rules may restrict assignment of resources 108 based on the identity or type of resource 108, VNF 102, VM 104, chassis 110, server 112, or any combination thereof.

An anti-affinity rule may restrict assignment of resources 108 for a particular VM 104 (or a particular type of VM 104). In contrast to an affinity rule—which may require that certain VMs 104 be instantiated on the same server 112 or chassis 110—an anti-affinity rule requires that certain VMs 104 be instantiated on different servers 112 (or different chasses 110). For example, an anti-affinity rule may require that MCM VM 104*a* be instantiated on a particular server 112 that does not contain any ASM VMs 104*b*. As another example, an anti-affinity rule may require that MCM VMs 104*a* for a first VNF 102 be instantiated on a different server 112 (or chassis 110) than MCM VMs 104*a* for a second VNF 102. Anti-affinity rules may restrict assignment of resources 108 based on the identity or type of resource 108, VNF 102, VM 104, chassis 110, server 112, or any combination thereof.

Within these constraints, resources 108 of hardware platform 106 may be assigned to be used to instantiate VMs 104, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular hardware platform 106.

For example, consider a session that may require gateway VNF 102*a* and PCRF VNF 102*b*. Gateway VNF 102*a* may require five VMs 104 instantiated on the same server 112, and PCRF VNF 102*b* may require two VMs 104 instantiated on the same server 112. (Assume, for this example, that no affinity or anti-affinity rules restrict whether VMs 104 for PCRF VNF 102*b* may or must be instantiated on the same or different server 112 than VMs 104 for gateway VNF 102*a*.) In this example, each of two servers 112 may have sufficient resources 108 to support 10 VMs 104. To implement sessions using these two servers 112, first server 112 may be instantiated with 10 VMs 104 to support two instantiations of gateway VNF 102*a*, and second server 112 may be instantiated with 9 VMs: five VMs 104 to support one instantiation of gateway VNF 102*a* and four VMs 104 to support two instantiations of PCRF VNF 102*b*. This may leave the remaining resources 108 that could have supported the tenth VM 104 on second server 112 unused (and unusable for an instantiation of either a gateway VNF 102*a* or a PCRF VNF 102*b*). Alternatively, first server 112 may be instantiated with 10 VMs 104 for two instantiations of gateway VNF 102*a* and second server 112 may be instantiated with 10 VMs 104 for five instantiations of PCRF VNF 102*b*, using all available resources 108 to maximize the number of VMs 104 instantiated.

Consider, further, how many sessions each gateway VNF 102*a* and each PCRF VNF 102*b* may support. This may factor into which assignment of resources 108 is more efficient. For example, consider if each gateway VNF 102*a* supports two million sessions, and if each PCRF VNF 102*b* supports three million sessions. For the first configuration—three total gateway VNFs 102*a* (which satisfy the gateway requirement for six million sessions) and two total PCRF VNFs 102*b* (which satisfy the PCRF requirement for six million sessions)—would support a total of six million sessions. For the second configuration—two total gateway VNFs 102*a* (which satisfy the gateway requirement for four million sessions) and five total PCRF VNFs 102*b* (which satisfy the PCRF requirement for 15 million sessions)—would support a total of four million sessions. Thus, while the first configuration may seem less efficient looking only at the number of available resources 108 used (as resources 108 for the tenth possible VM 104 are unused), the second configuration is actually more efficient from the perspective of being the configuration that can support more than the greater number of sessions.

To solve the problem of determining a capacity (or, number of sessions) that can be supported by a given hardware platform 105, a given requirement for VNFs 102 to support a session, a capacity for the number of sessions each VNF 102 (e.g., of a certain type) can support, a given requirement for VMs 104 for each VNF 102 (e.g., of a certain type), a given requirement for resources 108 to support each VM 104 (e.g., of a certain type), rules dictating the assignment of resources 108 to one or more VMs 104 (e.g., affinity and anti-affinity rules), the chasses 110 and servers 112 of hardware platform 106, and the individual resources 108 of each chassis 110 or server 112 (e.g., of a certain type), an integer programming problem may be formulated.

Figure 2:
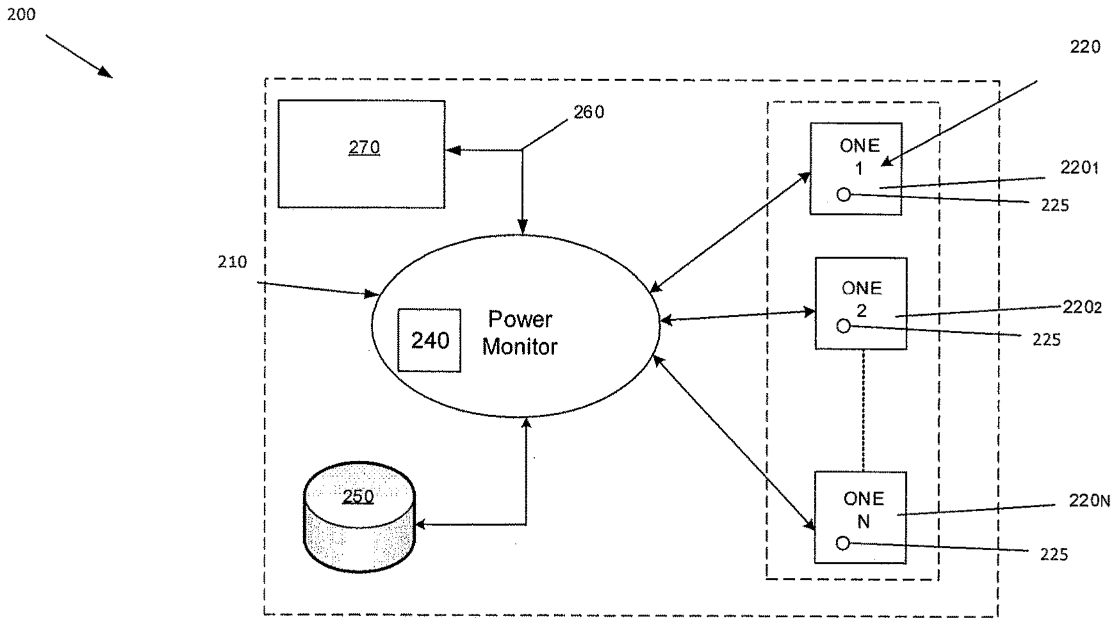
FIG. 2 is a representation of an optical transport network maintenance system according to an example.

It will be understood that the various networks described herein including the network described in connection with FIGS. 1*a* and 1*b*, comprise network elements that rely on optical transport of communications and signals. Such networks include optical network elements that include optical emitters, such as lasers, that can degrade in performance over time and require repair or replacement to restore the element to appropriate service levels. Typically, degradation is not detected until a network element fails or stops functioning properly. According to an example, an optical transport network predictive maintenance system, generally indicated by the number 200 in FIG. 2 is provided to improve the likelihood of detecting degradation in an optical network element before PM loss or a hard failure.

System 200 generally includes a power monitor indicated by the number 210. Power monitor 210 may be a standalone device or incorporated in a network device or a virtual machine. Power monitor 210 communicates with at least one optical network element, generally indicated by the number 220. Optical network elements 220 include ports, cards and other network elements that use an optical emitter 225, such as a laser or other suitable optical device to transmit information across the network 230. With reference to FIG. 2, network 230 may include any number optical network elements 220 including for example a first optical network element $\mathbf{220}_1$, a second optical network element $\mathbf{220}_2$ through an nth optical network element $\mathbf{220}_N$.

Power monitor 210 selectively communicates with the optical network elements 220 to retrieve an actual power level for each optical emitter 225. Power monitor 210 may be configured to retrieve actual power levels from every optical network element on a selected network or portion thereof, or it may be configured to retrieve actual power levels from selected devices. For example, selective retrieval may include limiting communication from the power monitor 210 to selected optical network elements 220 based on the capacity or bandwidth of such elements to manage the load that power monitor 210 places on network 230. In one example, power monitor 210 is configured to retrieve actual power levels from cards of 100 gigabytes or greater. In an alternative example, selective retrieval may include communicating with a portion of network elements at one time period and a remainder at another time period to manage the load that power monitor 210 places on the network. Other variations of selectively communicating with the at least one of plural optical network elements 220 may be employed.

Power monitor 210 is configured to perform retrieval at a frequency. The frequency may vary depending on the number optical network elements 220 or other considerations including loads on a particular network, off peak availability and vendor specifications. For example, the frequency may be once per month, per week, per day, or other time periods. The power monitor 210 is configured to retrieve actual power levels at regular intervals defined by the frequency on a repetitive basis.

Power monitor 210 may include or be connected to a memory 240. As actual power levels are retrieved, power monitor 210 is configured to store the retrieved actual power levels. These retrieved power levels may be stored along with the date and time of retrieval and an identification for the particular optical network element 220. Power monitor 210 may be further configured to analyze the actual power levels within memory 240 to generate trend data for each optical network element. The trend data may also be stored in memory 240 or another data store. The trend data includes actual power levels as a function of time, and may be used to determine a rate of change in the power level over time. Power monitor is configured to analyze the stored actual power levels and trend data to provide predictive maintenance information as discussed more completely below.

Power monitor 210 may further be connected to a data store 250 that includes a specified power level for each optical network element with which power monitor 210 is in communication. The specified power level may include a low water mark and a high water mark, which may simply be referred to herein as a low mark and a high mark. The low mark and high mark define a specified power level range. The specified power level range may be provided within the data store by a vendor to indicate the acceptable operating power level for a particular optical network element. An acceptable tolerance may further be provided to broaden or narrow the operating range for an optical network element. For example, it may be acceptable for the network element to work outside of the specified power level range by a value less than the low mark and greater than the high mark. In these instances, acceptable tolerance may be an absolute value added to the high mark and subtracted from the low mark in the specified power level range. In other instances, the optical network element acceptable tolerance may be a value greater than the low mark and less than the high mark to define a more narrow range than the specified power level range. This is common where the optical element will function within the specified range, but is more prone to producing errors as the low mark or high mark are approached. To that end, if such information is not available in the data store, power monitor may be configured to define an acceptable tolerance or establish an operating range that is less than the specified power level range. Defining such an operating range assists in addressing degrading components prior to failure as described more completely below.

According to an example, power monitor 210 is configured to compare the actual power level retrieved from the optical network element for any optical emitter to the specified power level. Power monitor 210 may be configured to generate a signal 260 if the actual power level is outside of the specified power level by an amount greater than the accepted tolerance. It will be understood that the accepted tolerance may be zero such that an actual power level outside of the specified power level range would cause power monitor to generate a signal. The signal may include an alert communicated to an output device 270, such as a monitor, printer, speaker or the like, identifying the particular optical network device and/or optical emitter that is operating outside of its normal operating range. The alert may contain a notice to repair or replace the optical network element. In other examples, signal may include an update to the frequency at which actual power level for the optical network element 220 is retrieved. For example, if power monitor 210 checks all optical network elements 220 at a first frequency, an indication that at least one of those optical network elements is operating outside of the specified power level range, may be used to cause power monitor to retrieve a power level for the particular optical network element on a second frequency that is different than first frequency. For example, second frequency may be greater than the first to increase the number of actual power level data points and determine if the optical network element 220 is about to fail. The second frequency may be implemented for a limited time. For example, if the actual power level returns to a normal operating level for a period of time, power monitor 210 may determine that the out of range level was an anomaly and return monitoring to the first frequency.

Figure 2A:
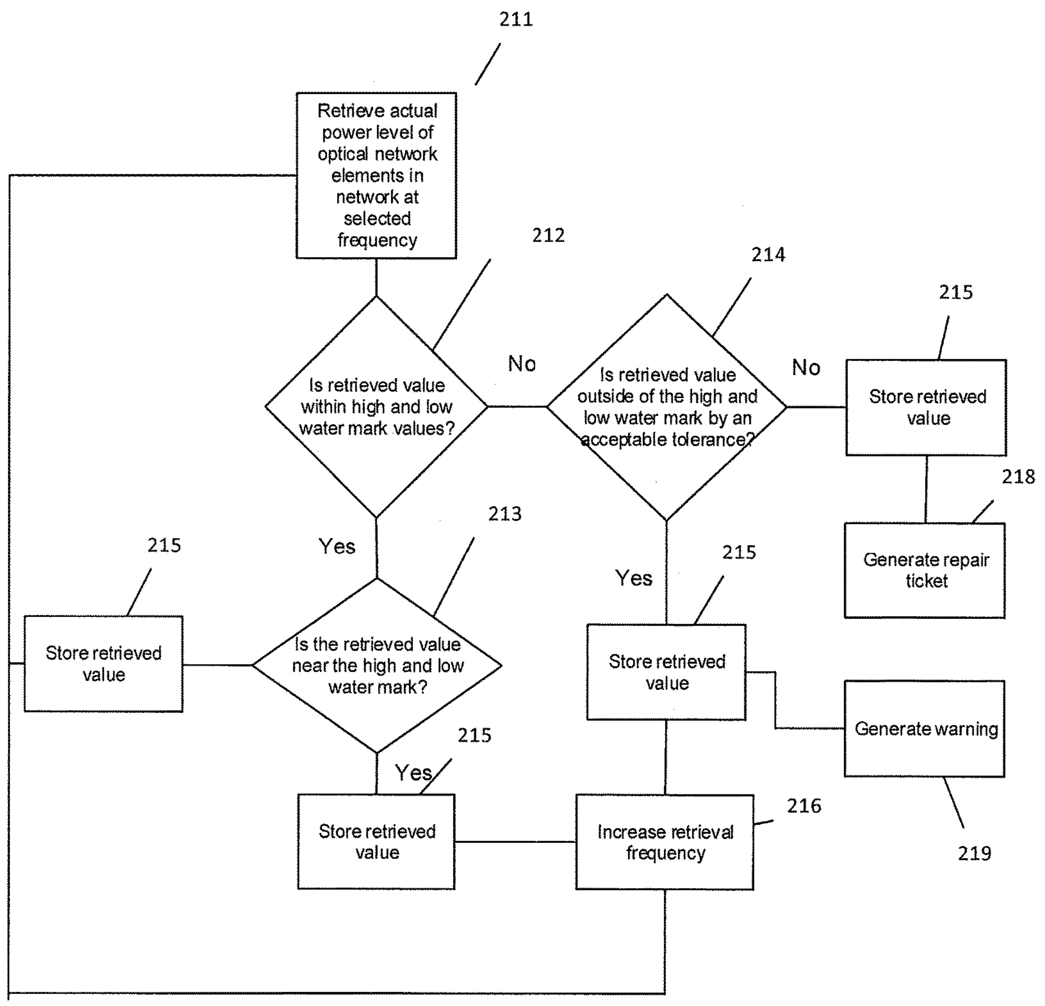
FIG. 2*a* is a flow chart depicting operation of an optical transport network maintenance system according to one example.

With reference to FIG. 2*a*, one example methodology implemented through power monitor 210 is depicted. Power monitor 210 is configured to retrieve an actual power level of at least one optical network element 220 at a first step 211. At a second step 212, power monitor 210 compares the retrieved actual power level to a specified power level having high and low water mark values. In the example, if the retrieved value is within the high and low water mark values, power monitor 210 may further analyze the actual power level to determine if it is near the high and low marks. For example, if actual power level is within 10% of either of the high or low mark, power monitor 210 flags the optical network element as possibly degrading performing a storage step 215 to save the retrieved value in memory 240, and increasing the retrieval frequency at a step 216. If the retrieved value is not near the high or low marks, the power monitor performs a storage step 215, and restarts the process.

If at step 212, the actual power level retrieved is outside the high and low mark, at step 214, power monitor determines whether the retrieved value is within an acceptable tolerance. If it is not within an acceptable tolerance, the optical network element is judged to be in a degraded or faulty state. Power monitor performs a storage step 215 to save the retrieved actual power level and generates a signal at 218 communicating to an input/output device 270 that repair or replacement of the faulty optical network element 220 is required.

If at step 214, the actual power level is within an acceptable tolerance, a storage step 215 is performed to save the actual power level in memory 240, and power monitor 210 increases the frequency of retrieval for the affected optical network element at 216.

With continued reference to FIG. 2A, if the retrieved value is outside of the high and low water mark at step 214 but still within an accepted tolerance, in addition to storing retrieved value at step 215, system 200 may also generate a warning at 219. The warning 219 may be displayed on a suitable input/output device 270 including but not limited to the graphical user interface described below. Warning 219 may be simply informational in nature or warning 219 may include a prompt for input. For example, warning 219 may indicate information including that the network element is outside of the specified range yet within tolerance; the identity of the network element, the location of the network element, and/or an indication that the network element will be monitored more frequently. Alternatively or in addition to the informational warning, an active warning may prompt the user with the option of declining increased monitoring, accepting increased monitoring according to the default schedule, or setting a custom monitoring schedule for the selected network element.

Figure 2B:
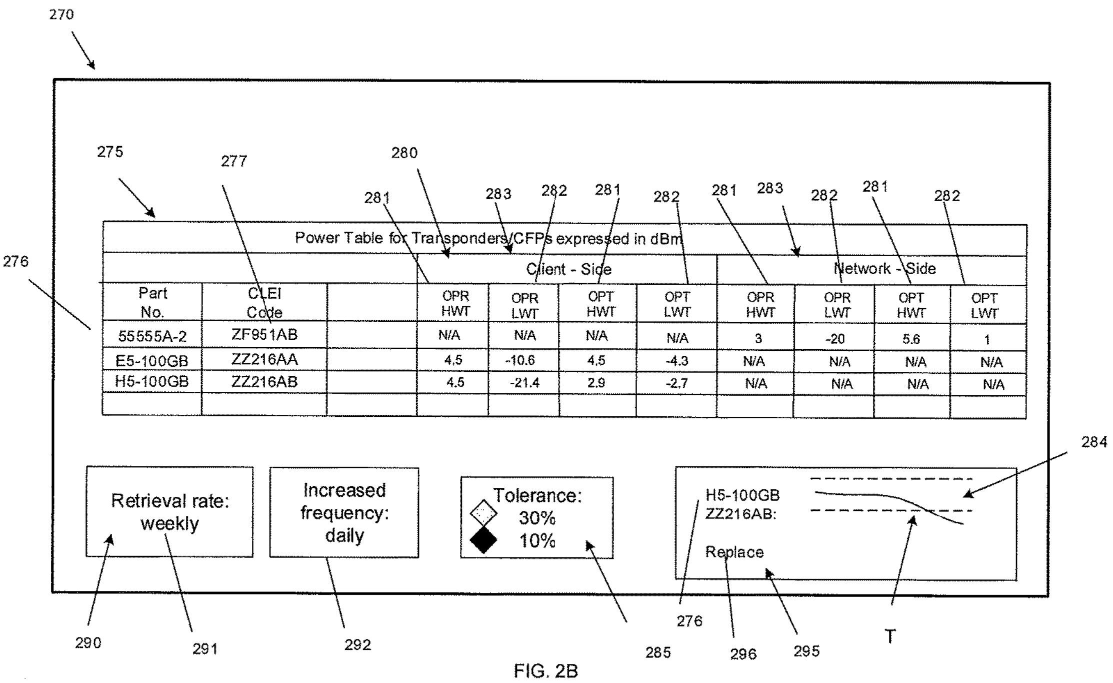
FIG. 2*b* is a representation depicting a graphical user interface for an optical transport network maintenance system according to one example.

With reference to FIG. 2B, an example of an input/output device 270 is depicted. In the example, input/output device 270 is a graphical user interface displaying optical network element vendor information 275 for optical network elements 220 within a selected network 230 for which power monitor 210 performs power level retrieval. In the example, power monitor 210 obtains vendor information 275 from a data store as discussed previously. Vendor information 275 may include and identifier 276, a reference code 277, such as a common language equipment identification code or CLEI code, and a specified power level, generally indicated by the number 280. Specified power level 280 may include a high water mark 281 and a low water mark 282 defining the specified power level range 283. As shown in the example, multiple specified power level ranges may be provided, for example, a client side range and a network side range. Likewise, specified power level 283 may define multiple high and low marks 281,282. In the example, an optical power received (OPR) high and low mark and an optical power transmitted (OPT) high and low mark are provided. The OPR range is broader than the OPT range. Testing may consider either range (OPR, OPT).

In one example, operation outside of a range may cause power monitor 210 to increase the frequency of monitoring to determine if such operation is an indication of degrading performance. Alternatively, operation outside of a range may be flagged by power monitor 210 in memory such that if subsequent retrievals indicate that optical network element 220 continues to operate outside of range, the retrieval frequency is increased. As discussed previously, an acceptable tolerance, generally indicated at 285, may be used to further evaluate whether optical network element 220 is operating at an acceptable power level or requires repair or replacement. The acceptable tolerance 285 may be defined within vendor information 275, a user definable amount, or a tunable amount determined by trend analysis performed by power monitor 210. In the example, input/output device 270 displays a user selectable tolerance expressed as multiple percentages (10% and 30%), where the user in the example has selected a 10% tolerance. It will be understood that this is one example and other user inputs including numerical entry, low to high scales, and the like may be used to set a tolerance. The acceptable tolerance may be used to define an operating range 284 within specified range 283 by considering a reduction in the range based on the tolerance level. In the example, acceptable tolerance 285 may be used to reduce the high mark and increase the low mark by a value, such as the percentages shown. Alternatively, the percentages may be used to increase the operating range outside of the specified power level range. Using the percentages shown, one operating range within the specified power level range may be 70% of the specified power level range i.e. 30% tolerance reduction. Another example would be 90% of the specified power level range i.e. 10% tolerance reduction. The tolerance reduction may be achieved by reducing high and low water marks by an equal percentage (15%/15% or 5%/5%) in the examples provided or an unequal apportionment may be applied. In the alternative example, the specified range could be increased by the tolerance percentage, such as, 130% of the specified range (30% tolerance) or 110%(10% tolerance). In such situations, power monitor 210 may evaluate whether the actual power level is within the operating range 284 i.e. the specified power level range plus or minus the applicable acceptable tolerance to combine steps 211 and 212 in FIG. 2A.

With reference to FIG. 2B, a schedule, generally indicated by the number 290 is depicted on an input/output device 270 indicating at least a first frequency 291 at which power monitor 210 performs a retrieval of the actual power level for at least one optical network element 220. As described above, first frequency 291 may be a preset value, a user determined value or a variable value that accounts for load and modifies the schedule 290 to perform retrieval during off peak times or is tunable by power monitor 210 based on trend data. Schedule 290 may further include a second frequency 292, which like first frequency 291, may be a preset value, a user determined value or a variable value that accounts for network loads or is tuned by power monitor 210 based on trend data.

Power monitor 210 may display trend data T on input/output device 270. In the example shown, trend data T may include a representation of the operating range 284 overlaid thereon. In the example trend data T is provided along with a signal 295 to repair/replace a particular optical network element 220. In the example, signal 295 provides the identifier 276 for the optical network element, an alert 296 indicating repair/replacement is needed along with trend data T.

Figure 2C:
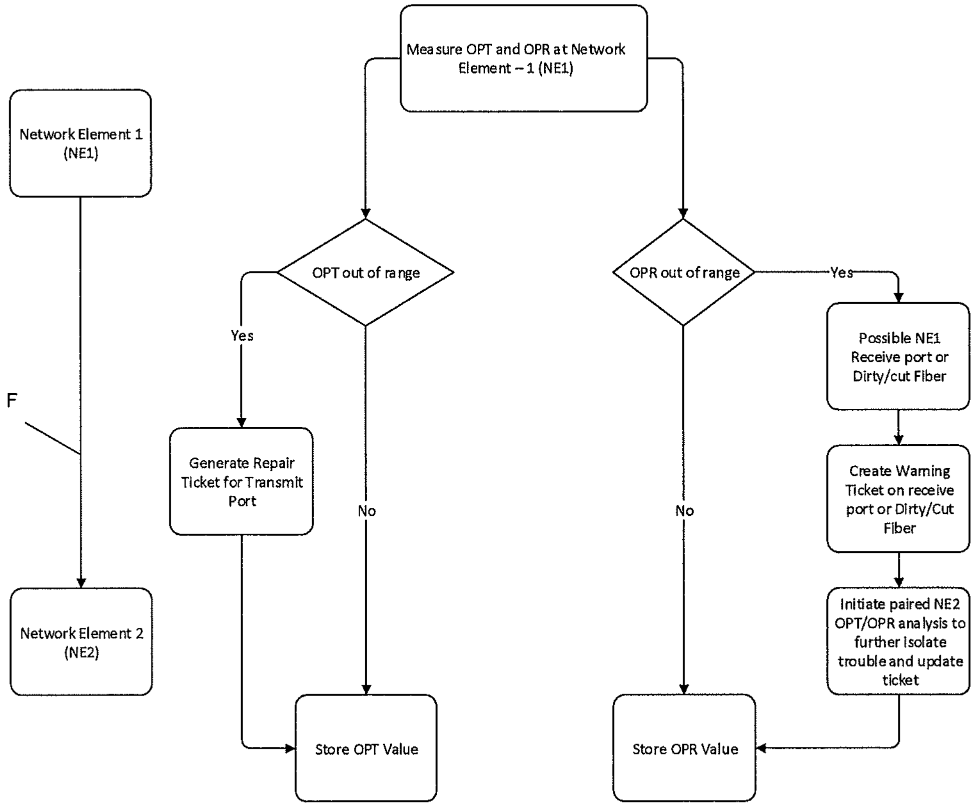
FIG. 2*c* is a flow chart and schematic depiction of operation of an optical transport network maintenance system according to one example.

With reference to FIG. 2C, consideration of the connection between network elements is considered. It will be understood that multiple optical network elements may be connected by communication lines, such as cables or fibers. For simplicity, the example in FIG. 2C depicts a first network element NE1 and a second network element NE2 optically connected by a fiber F. Each network element has an optical component that transmits and receives signals across fiber as indicated by arrows. When measuring OPT and OPR for the network elements, the OPT value is a good indicator of the transmitting performance for the network element from which it is received. OPR, however is dependent upon the signal coming from another network element and the connection through which the signal travels. Therefore, in the example shown, OPT and OPR values are retrieved from network element 1. Both values may be evaluated as described above in connection with FIG. 2A. In the flow diagram of FIG. 2C, OPT and OPR values are measured to determine if they are within the specified range. In the example, the measurement is for a first network element NE1. If the OPT is out of range, this indicates that a transmitting optical element on first network element NE1 needs repair or replacement. System 200 generates a repair ticket for the corresponding transmit port on first network element NE1 and stores the measured value for OPT in memory 240.

If the OPR value for first network element NE1 is out of range, this does not immediately indicate an issue on first network element NE1 since the reception of a signal is also dependent on the connecting fiber and the transmitting port on second network element NE2. Therefore, if OPR is out of range, system 200 may flag a possible problem with first network element receive port or a dirty or cut fiber. System 200 may also generate a warning ticket to this effect. To attempt to isolate the problem, system 200 may also initiate a paired NE2 OPT/OPR analysis. Subsequent to any of the OPT/OPR measurements, system 200 stores the respective values in memory 240, as shown.

Figure 3:
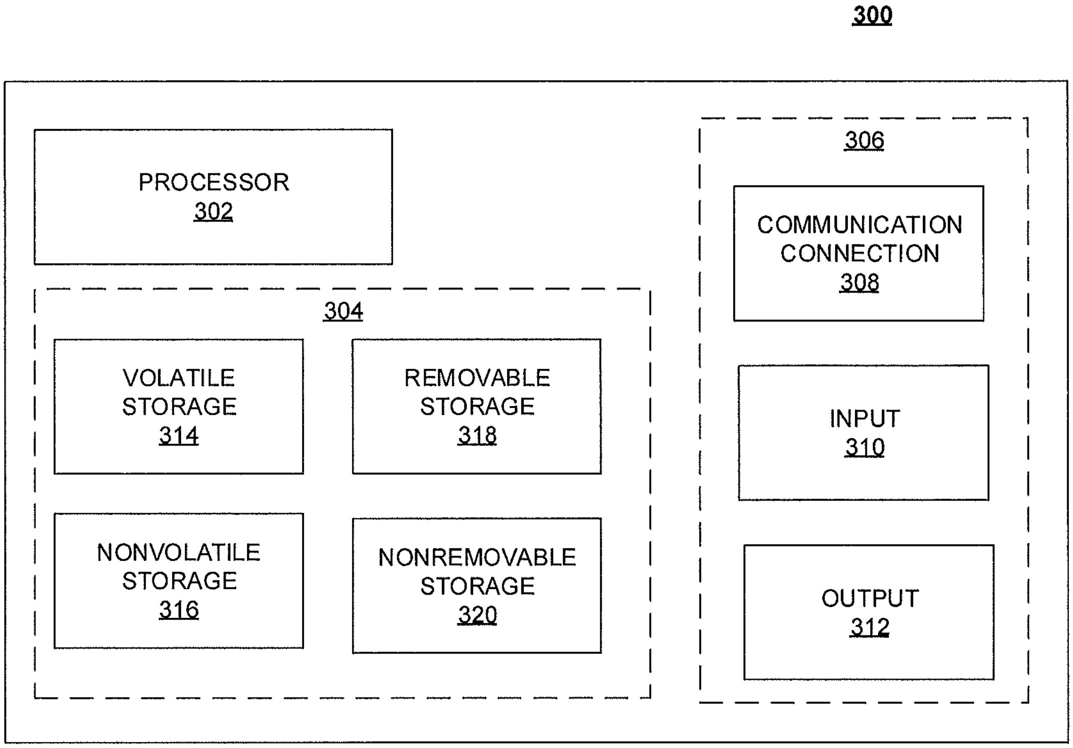
FIG. 3 is a representation of a network device according to an example.

It will be understood that power monitor 210 may be implemented in a network device. FIG. 3. illustrates a functional block diagram depicting one example of a network device, generally indicated at 300. Network device 300 may comprise a processor 302 and a memory 304 coupled to processor 302. Memory 304 may contain executable instructions that, when executed by processor 302, cause processor 302 to effectuate operations associated with translating parallel protocols between end points in families as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

BAFX 250 may reside within any network to facilitate communication between edge routers from disparate network families and services. The following are example networks on which BAFX 250 may reside. For purposes of centrality, BAFX 250 may reside within a core network shown in the various examples below. However, it will be understood that BAFX 250 may reside on any network where communication between families with different protocols is desired including but not limited to telecommunications networks, internet, and other networks described more completely below.

Figure 4:
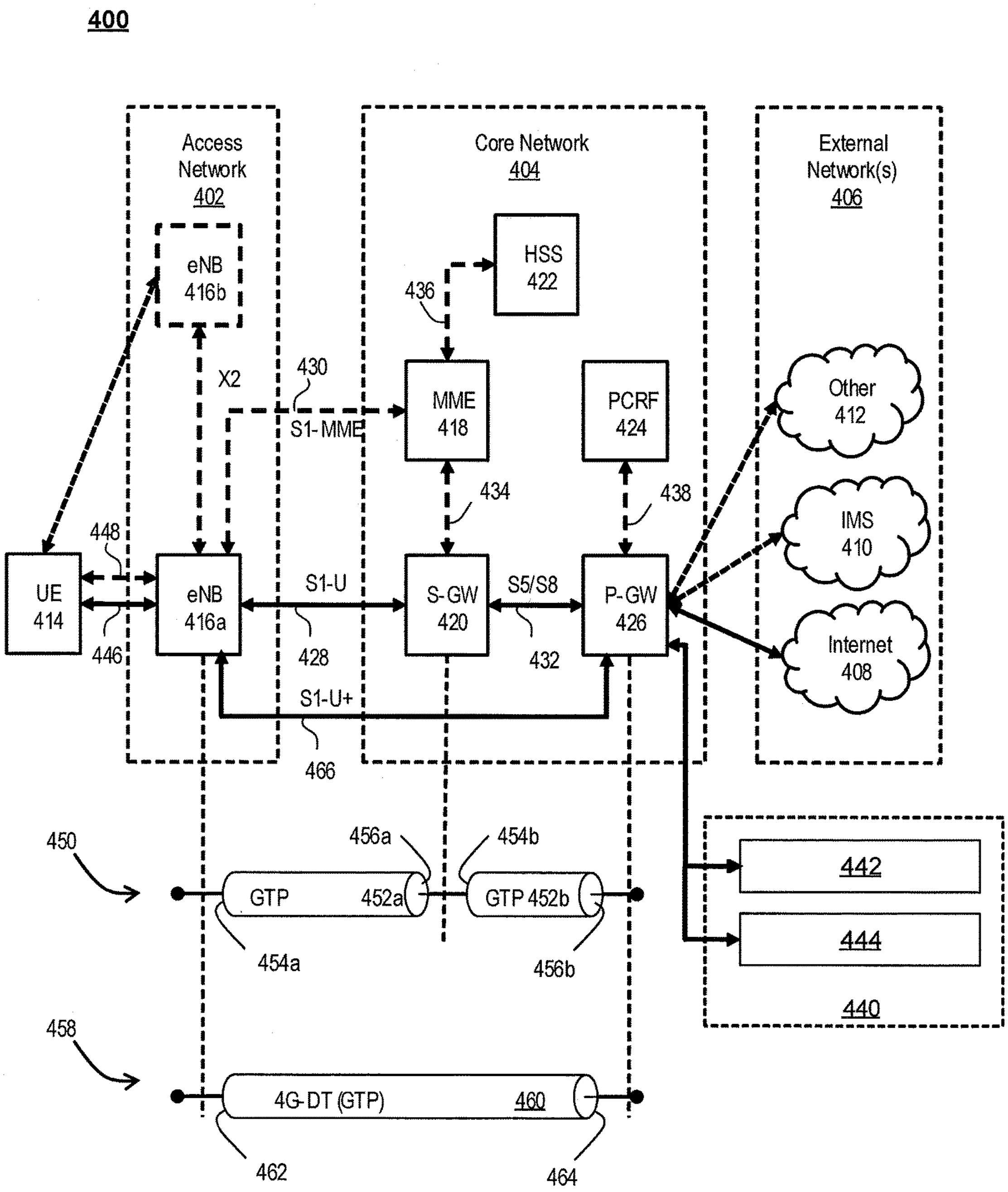
FIG. 4 depicts an exemplary communication system that provide wireless telecommunication services over wireless communication networks that may be at least partially implemented as an SDN.

FIG. 4 illustrates a functional block diagram depicting one example of an LTE-EPS network architecture 400 that may be at least partially implemented as an SDN. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416*a*, 416*b*. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PDN gateway (PGW) 426. According to the example, PGW 426 is an exchange 200 according to the example described above. PGW 426 may include a BAFX 250 as discussed above. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416*a* to second eNB 416*b* as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416*a*.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426, PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring and/or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MIVIEs 418, SGWs 420 or PGWs 426.

In the illustrative example, data traversing a network path between UE 414, eNB 416*a*, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416*a*, a second portion (e.g., an S1 data bearer 428) between eNB 416*a* and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416*a*, and a second signaling portion (e.g., S1 signaling bearer 430) between eNB 416*a* and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452*a* between two tunnel endpoints 454*a* and 456*a*, and a second tunnel 452*b* between two tunnel endpoints 454*b* and 456*b*. In the illustrative example, first tunnel 452*a* is established between eNB 416*a* and SGW 420. Accordingly, first tunnel 452*a* includes a first tunnel endpoint 454*a* corresponding to an S1-U address of eNB 416*a* (referred to herein as the eNB S1-U address), and second tunnel endpoint 456*a* corresponding to an S1-U address of SGW 420 (referred to herein as the SGW S1-U address). Likewise, second tunnel 452*b* includes first tunnel endpoint 454*b* corresponding to an S5-U address of SGW 420 (referred to herein as the SGW S5-U address), and second tunnel endpoint 456*b* corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416*a* and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416*a* and PGW 426, by way of SGW 420. That is, SGW 420 can serve a relay function, by relaying packets between two tunnel endpoints 416*a*, 426. In other scenarios, direct tunneling solution 458 can forward user data packets between eNB 416*a* and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
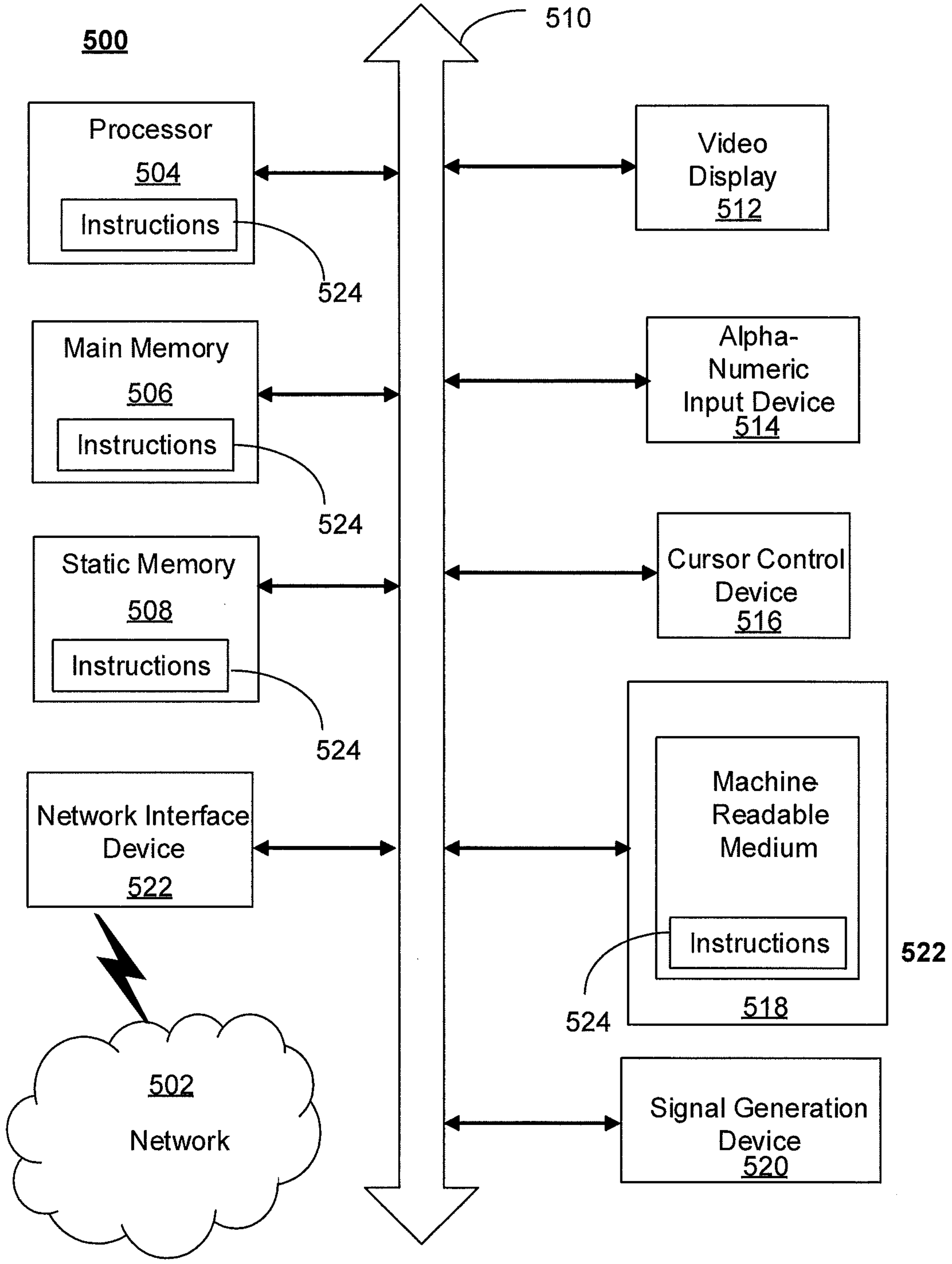
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as a processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment. As depicted in such instances, computer system 500 may operate as an exchange 200.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
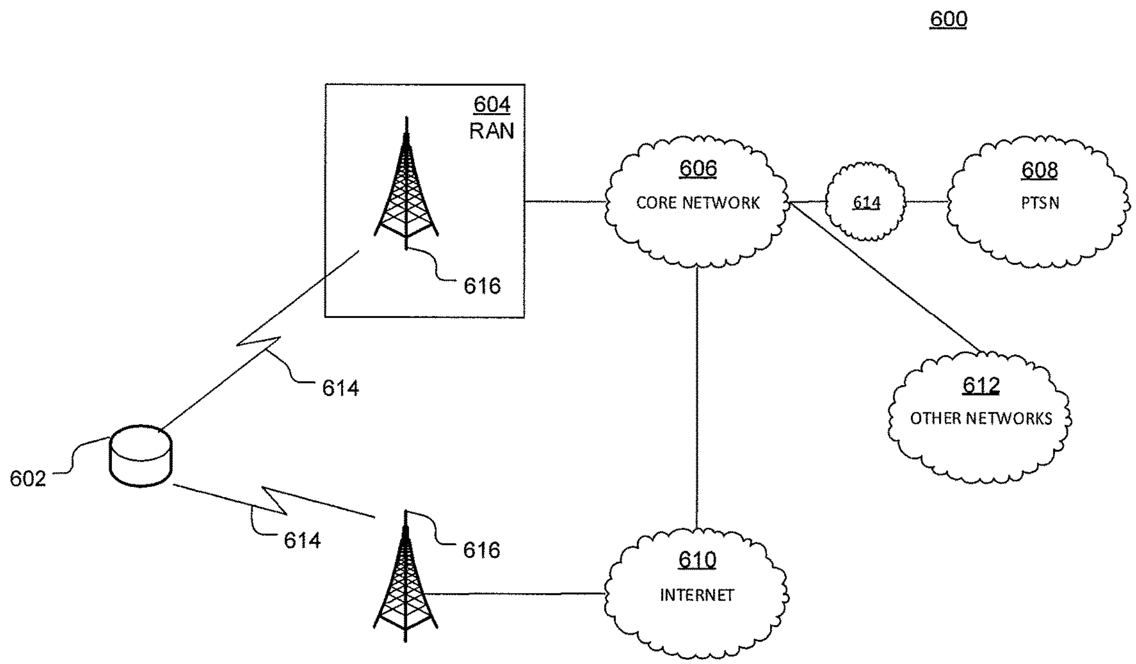
FIG. 6 is a representation of a telecommunications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. As previously discussed, core network 606 may house exchange 200 that includes a BAFX 250 as best shown in FIGS. 2-2*b* incorporated by reference.

Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
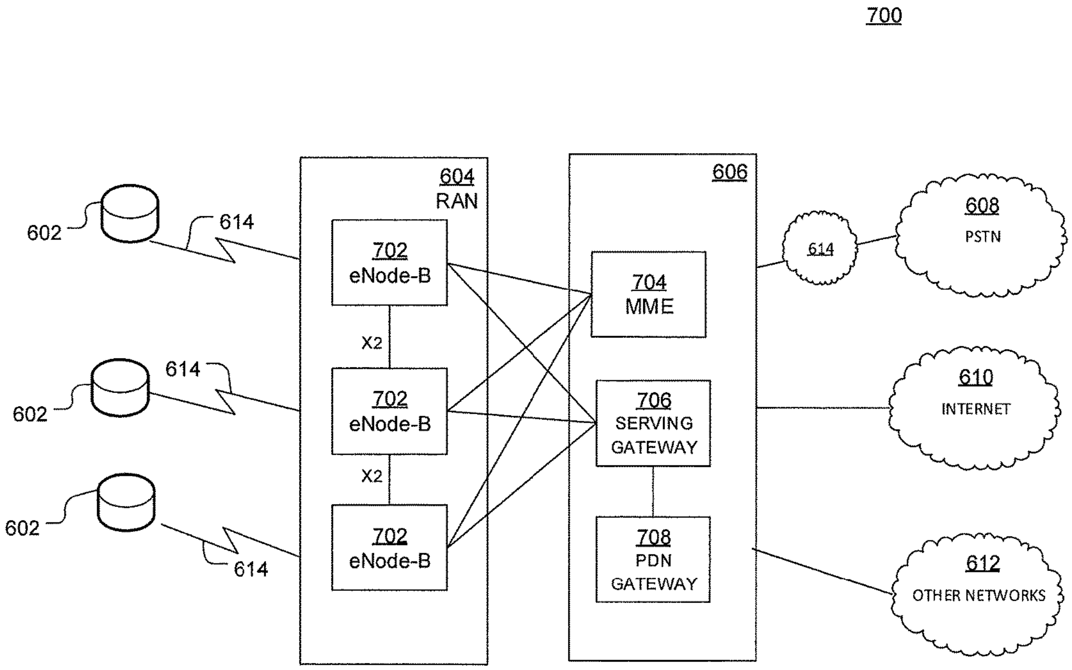
FIG. 7 is a representation of a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. As discussed with reference to FIG. 6, core network 606 may include an exchange 200 with a BAFX. As discussed in more detail above, exchange 200 may take on the role and eliminate a data plane gateway, such as PDN 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
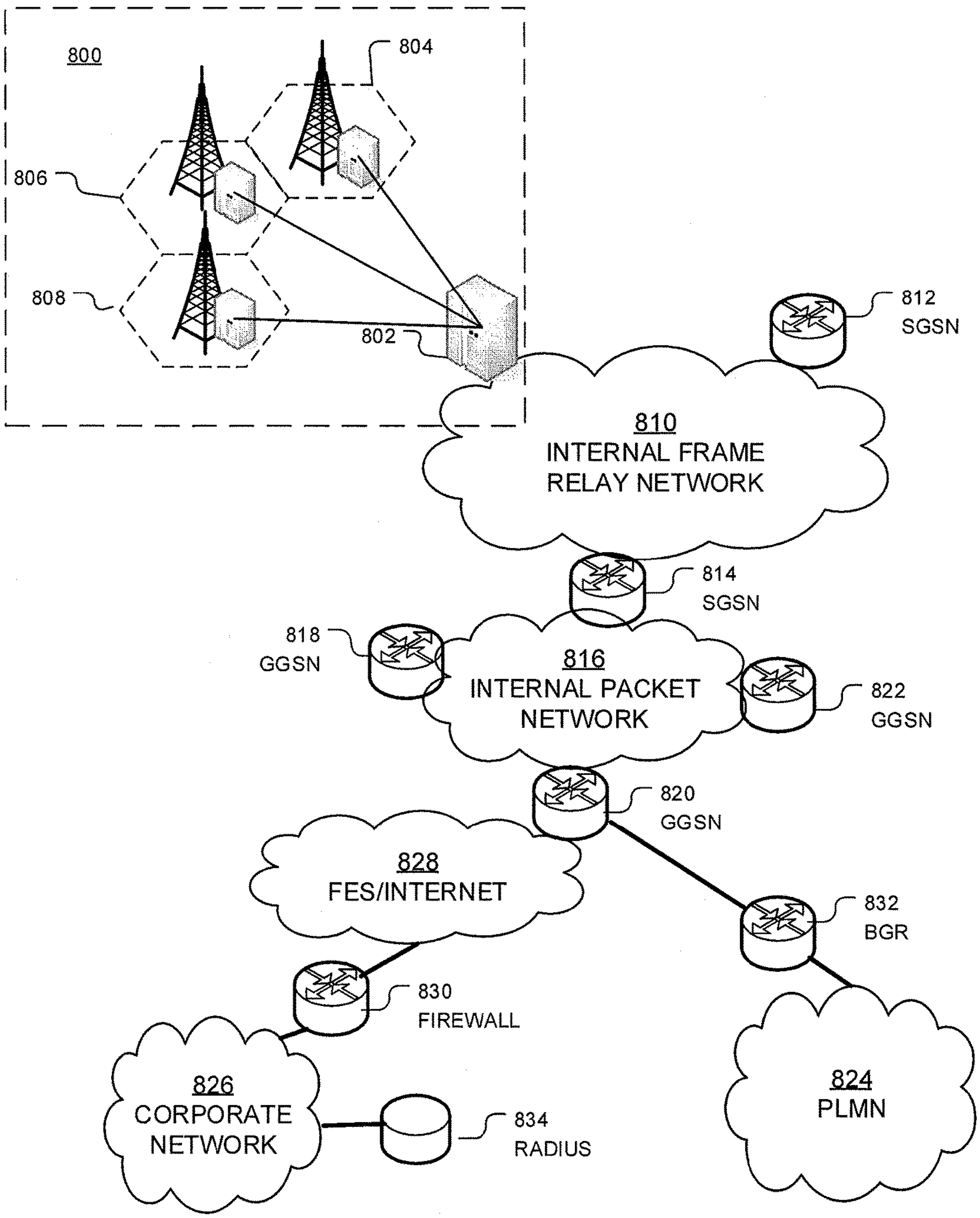
FIG. 8 is a representation packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a border gateway router (BGR) 832. According to the examples described above, GGSNs may include an exchange 200 including a BAFX 250 to facilitate the interface between various networks, corporate intranets/intenets, fixed end systems and public internet. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
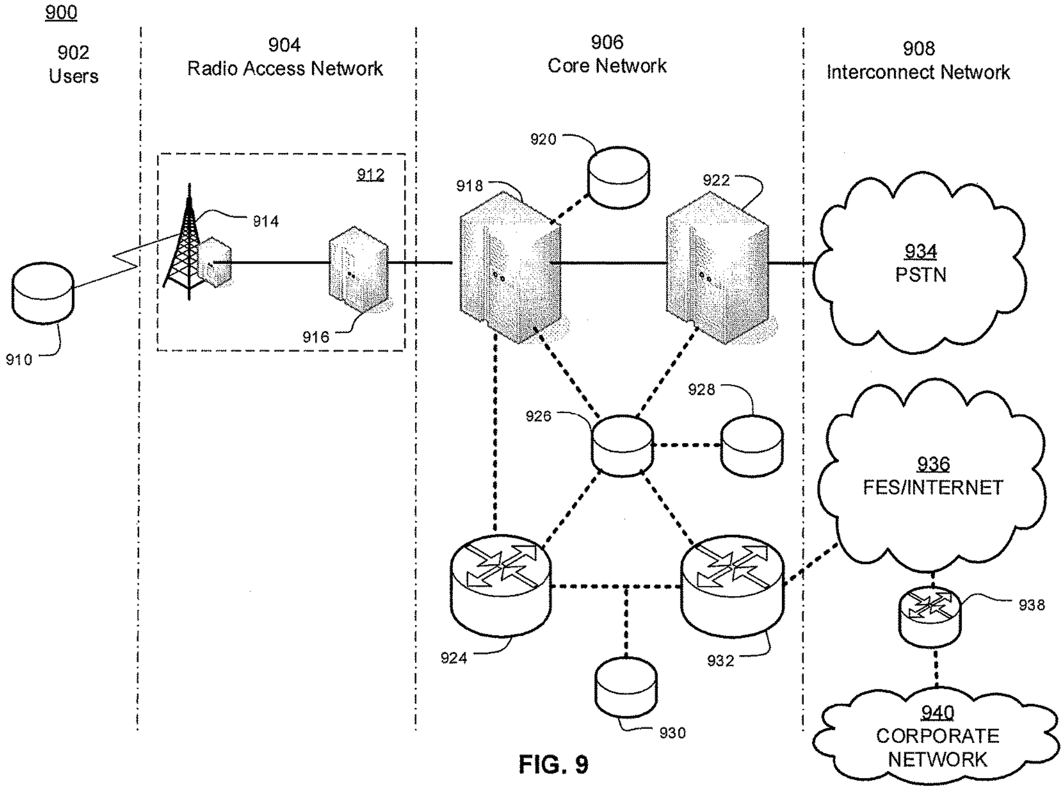
FIG. 9 is a representation of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 938, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
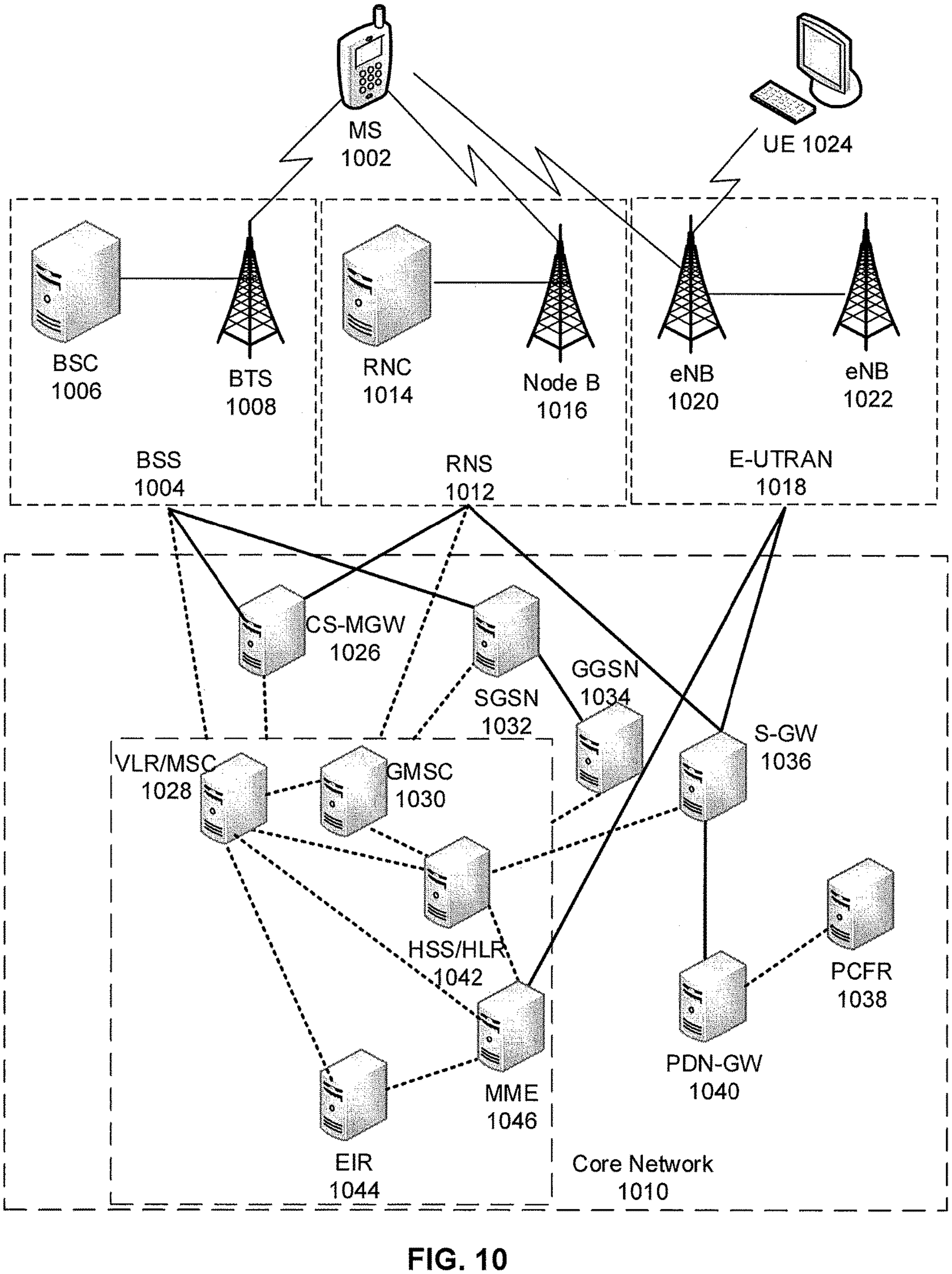
FIG. 10 is a representation a PLMN architecture.

FIG. 10 illustrates a block diagram of an example PLMN architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

EXAMPLES

Example 1

A system for predictive maintenance of at least one optical network element in an optical transport network comprising: a power monitor in communication with the at least one optical network element, the power monitor configured to selectively retrieve an actual power level from the optical network element; the power monitor being in communication with a data store having a specified power, level for each of the at least one optical network element and an acceptable tolerance, wherein the specified power level includes a low mark and a high mark defining a specified power level range; wherein the power monitor compares the actual power level to the specified power level; and generates a signal if the actual power level is outside of the specified power level range by an amount greater than the acceptable tolerance.

Example 2

The system of example 1, wherein the signal includes a notice to repair or replace the at least one optical network element that is outside of the specified power level range.

Example 3

The system of example 1, wherein the power monitor is configured to selectively retrieve the actual power level at a first frequency, wherein upon detecting an actual power level within the specified range but outside of an operating range, the power monitor is configured to selectively retrieve the actual power level for the at least one optical network element with the actual power level outside of the operating range to a second frequency, wherein the second frequency is greater than the first frequency.

Example 4

The system of example 3, wherein the operating range is 70% of the specified range.

Example 5

The system of example 3, wherein the operating range is 90% of the specified range.

Example 6

The system of example 1, wherein the power monitor is configured to store the actual power level obtained during each selected retrieval in a memory, wherein the power monitor is configured to analyze a trend defined by comparing the actual power level in the memory as a function of time, and wherein upon detecting a degradation in performance within the trend, the power monitor is configured to perform at least one of increasing a frequency of selectively retrieval of the power level or generating a signal to repair or replace the at least one optical network element having the degradation in performance within the trend.

Example 7

The system of example 1, wherein the acceptable tolerance is plus or minus 10% of the low mark and high mark.

Example 8

The system of example 1, wherein the power monitor is configured to retrieve the actual power level according to a schedule, wherein the power monitor is configured to determine the schedule based in part upon network load and retrieve the actual power level during a non-peak network load time period.

Example 9

The system of example 8, wherein the schedule includes a first frequency on which the power monitor is configured to retrieve the actual power level, and wherein the power monitor is configured to increase the first frequency upon detecting the actual power level is within outside or inside of the specified power range by an acceptable tolerance.

Example 10

The system of example 8, wherein the acceptable tolerance is 30%

Example 11

The system of example 8, wherein the acceptable tolerance is 10%.

Example 12

A system for predictive maintenance of an optical transport network, the system comprising: plural optical network elements in the optical transport network, each optical network element operating at an actual power level; at least one data store having a specified power level for each optical network element, wherein the specified power level includes a low mark and a high mark defining a specified power level range; a power monitor in communication with the data store and the optical network elements, the power monitor configured to selectively communicate with each optical network element according to a schedule, to retrieve the actual power level and store the actual power level in a memory, the power monitor is further configured to compare the actual power level to the specified power level, and wherein the power monitor is configured to generate a first signal upon detecting that the actual power level for at least one of the plural optical network elements is within an acceptable tolerance of the low mark or high mark, and wherein the power monitor is configured to generate a second signal upon detecting the actual power level for at least one of the plural optical network elements is outside of specified power level range.

Example 13

The system of example 12, wherein the schedule includes a retrieval frequency, and wherein the first signal generated by the power monitor is configured to increase the retrieval frequency for the at least one of the plural optical network elements operating within an acceptable tolerance of the specified power level range.

Example 14

The system of example 12, wherein the second signal is a notice to repair or replace the one of the plural optical network elements operating outside of the specified range.

Example 15

The system of example 12, wherein the power monitor is configured to analyze a trend defined by comparing the actual power level for each of the plural optical network elements in the memory as a function of time, and wherein upon detecting a degradation in performance within the trend, the power monitor is configured to perform at least one of increasing a frequency of selectively retrieval of the power level or generating a signal to repair or replace the at least one optical network element having the degradation in performance within the trend.

Example 16

The system of example 12, wherein the acceptable tolerance is plus or minus 30%.

Example 17

The system of example 12, wherein the acceptable tolerance is plus or minus 10%.

Example 18

The system of example 12, wherein the power monitor is configured to define an operating range that is less than the specified power level, and wherein the power monitor is configured to generate the second signal if the actual power level of at least one of the plural optical network elements is outside of the operating range.

Example 19

The system of example 12, wherein at least one of the plural optical network elements reside in at least one of a first level network, a second level network and a third level network.

Example 20

The system of example 12, wherein the specified power level includes an optical power transmit value and an optical power receive value for the network element; and wherein upon detecting an optical power receive value outside of the specified range, power monitor retrieves the optical power transmit value for the network element; communicates with at least a second network element connected to the network element by a connection and retrieves an optical power transmit value for the at least second network element; and wherein the power monitor determines if the optical power transmit value for the network element is within the specified range and if the optical power transmit value for the second network element is with a specified range for the second network element; and wherein if at least one of optical power transmit values for the network element and the second network element are out of the specified range, power monitor recommends repair of at least one of the network element and the at least one second network element; and if the power monitor determines that the network element and the at least one second network element have optical transmit values within the specified range, the power monitor recommends at least one of repair and replacement of the connection.

Example 21

The system of example 3, wherein the operating range includes a vendor value stored in the data store and accessible by the power monitor.

Example 22

The system of example 6, wherein the power monitor is configured to update the vendor value in response to at least one of a passage of time and an input of an updated operating range.

The invention claimed is:

1. A system for predictive maintenance of at least one optical network element in an optical transport network comprising: a power monitor in communication with the at least one optical network element, the power monitor configured to selectively retrieve an actual power level from the optical network element; the power monitor being in communication with a data store having a specified power level for each of the at least one optical network element and an acceptable tolerance, wherein the specified power level includes a low mark and a high mark defining a specified power level range; wherein the power monitor compares the actual power level to the specified power level; and generates a signal if the actual power level is outside of the specified power level range by an amount greater than the acceptable tolerance;

wherein the power monitor is configured to store the actual power level obtained during each selected retrieval in a memory, wherein the power monitor is configured to analyze a trend defined by comparing the actual power level in the memory as a function of time, and wherein upon detecting a degradation in performance within the trend, the power monitor is configured to perform at least one of increasing a frequency of selectively retrieval of the power level or generating a signal to repair or replace the at least one optical network element having the degradation in performance within the trend.

2. The system of claim 1, wherein the signal includes a notice to repair or replace the at least one optical network element that is outside of the specified power level range.

3. The system of claim 1, wherein the power monitor is configured to selectively retrieve the actual power level at a first frequency, wherein upon detecting an actual power level within the specified range but outside of an operating range, the power monitor is configured to selectively retrieve the actual power level for the at least one optical network element with the actual power level outside of the operating range to a second frequency, wherein the second frequency is greater than the first frequency.

4. The system of claim 3, wherein the operating range is 70% of the specified range.

5. The system of claim 3, wherein the operating range is 90% of the specified range.

6. The system of claim 1, wherein the acceptable tolerance is plus or minus 10% of the low mark and high mark.

7. A system for predictive maintenance of at least one optical network element in an optical transport network comprising:

a power monitor in communication with the at least one optical network element, the power monitor configured to selectively retrieve an actual power level from the optical network element; the power monitor being in communication with a data store having a specified power level for each of the at least one optical network element and an acceptable tolerance, wherein the specified power level includes a low mark and a high mark defining a specified power level range; wherein the power monitor compares the actual power level to the specified power level; and generates a signal if the actual power level is outside of the specified power level range by an amount greater than the acceptable tolerance;

wherein the power monitor is configured to retrieve the actual power level according to a schedule, wherein the power monitor is configured to determine the schedule based in part upon network load and retrieve the actual power level during a non-peak network load time period.

8. The system of claim 7, wherein the schedule includes a first frequency on which the power monitor is configured to retrieve the actual power level, and wherein the power monitor is configured to increase the first frequency upon detecting the actual power level is within outside or inside of the specified power range by an acceptable tolerance.

9. The system of claim 7, wherein the acceptable tolerance is 30%.

10. The system of claim 7, wherein the acceptable tolerance is 10%.

11. A system for predictive maintenance of an optical transport network, the system comprising: plural optical network elements in the optical transport network, each optical network element operating at an actual power level; at least one data store having a specified power level for each optical network element, wherein the specified power level includes a low mark and a high mark defining a specified power level range; a power monitor in communication with the data store and the optical network elements, the power monitor configured to selectively communicate with each optical network element according to a schedule, to retrieve the actual power level and store the actual power level in a memory, the power monitor is further configured to compare the actual power level to the specified power level, and wherein the power monitor is configured to generate a first signal upon detecting that the actual power level for at least one of the plural optical network elements is within an acceptable tolerance of the low mark or high mark, and wherein the power monitor is configured to generate a second signal upon detecting the actual power level for at least one of the plural optical network elements is outside of specified power level range.

12. The system of claim 11, wherein the schedule includes a retrieval frequency, and wherein the first signal generated by the power monitor is configured to increase the retrieval frequency for the at least one of the plural optical network elements operating within an acceptable tolerance of the specified power level range.

13. The system of claim 11, wherein the second signal is a notice to repair or replace the one of the plural optical network elements operating outside of the specified range.

14. The system of claim 11, wherein the power monitor is configured to analyze a trend defined by comparing the actual power level for each of the plural optical network elements in the memory as a function of time, and wherein upon detecting a degradation in performance within the trend, the power monitor is configured to perform at least one of increasing a frequency of selectively retrieval of the power level or generating a signal to repair or replace the at least one optical network element having the degradation in performance within the trend.

15. The system of claim 11, wherein the acceptable tolerance is plus or minus 30%.

16. The system of claim 11, wherein the acceptable tolerance is plus or minus 10%.

17. The system of claim 11, wherein the power monitor is configured to define an operating range that is less than the specified power level, and wherein the power monitor is configured to generate the second signal if the actual power level of at least one of the plural optical network elements is outside of the operating range.

18. The system of claim 11, wherein at least one of the plural optical network elements reside in at least one of a first level network, a second level network and a third level network.

19. The system of claim 11, wherein the specified power level includes an optical power transmit value and an optical power receive value for the network element; and wherein upon detecting an optical power receive value outside of the specified range, power monitor retrieves the optical power transmit value for the network element; communicates with at least a second network element connected to the network element by a connection and retrieves an optical power transmit value for the at least second network element; and wherein the power monitor determines if the optical power transmit value for the network element is within the specified range and if the optical power transmit value for the second network element is with a specified range for the second network element; and wherein if at least one of optical power transmit values for the network element and the second network element are out of the specified range, power monitor recommends repair of at least one of the network element and the at least one second network element; and if the power monitor determines that the network element and the at least one second network element have optical transmit values within the specified range, the power monitor recommends at least one of repair and replacement of the connection.

* * * * *